(12) United States Patent
Ye

(10) Patent No.: US 8,815,338 B2
(45) Date of Patent: Aug. 26, 2014

(54) METHOD FOR PRODUCING COMPOSITE LITHIUM IRON PHOSPHATE MATERIAL AND COMPOSITE LITHIUM IRON PHOSPHATE MATERIAL PRODUCED BY SAME

(75) Inventor: Liguang Ye, Shandong (CN)

(73) Assignee: Haite Electronic Group Co., Ltd., Zaozhuang, Shandong (CN)

( * ) Notice: Subject to any disclaimer, the term of this patent is extended or adjusted under 35 U.S.C. 154(b) by 469 days.

(21) Appl. No.: 13/120,655

(22) PCT Filed: Jun. 21, 2010

(86) PCT No.: PCT/CN2010/000906
§ 371 (c)(1),
(2), (4) Date: Mar. 24, 2011

(87) PCT Pub. No.: WO2010/148638
PCT Pub. Date: Dec. 29, 2010

(65) Prior Publication Data
US 2011/0206989 A1    Aug. 25, 2011

(30) Foreign Application Priority Data
Jun. 21, 2009    (CN) .......................... 2009 1 0016269

(51) Int. Cl.
| | | |
|---|---|---|
| *B05D 7/00* | (2006.01) | |
| *H01M 4/00* | (2006.01) | |
| *C01B 25/45* | (2006.01) | |
| *H01M 4/58* | (2010.01) | |
| *H01M 10/052* | (2010.01) | |

(52) U.S. Cl.
CPC .......... *H01M 4/5825* (2013.01); *H01M 10/052* (2013.01); *C01B 25/45* (2013.01); *Y02E 60/12* (2013.01)
USPC .......................... 427/212; 427/215; 429/221

(58) Field of Classification Search
USPC .................................. 429/221; 427/212, 215
See application file for complete search history.

(56) References Cited

FOREIGN PATENT DOCUMENTS

| | | |
|---|---|---|
| CN | 101162776 A | 4/2008 |
| CN | 101580238 A | 11/2009 |
| EP | 1855334 | * 11/2007 |
| WO | PCT/CN2010/000906 | 9/2010 |

* cited by examiner

*Primary Examiner* — Timothy Meeks
*Assistant Examiner* — Ann Disarro
(74) *Attorney, Agent, or Firm* — Global IP Services; Tianhua Gu

(57) ABSTRACT

A method for producing a composite lithium iron phosphate material, which comprises formulating lithium iron phosphate material and purified water at a weight ratio of 1:5-15 into a suspension solution, slowly adjusting the pH value of the suspension solution to 1-3 with phosphoric acid at a concentration of 5-30% in weight, adding an analytically pure soluble chloride in an amount of 0.05-2% based on the molar amount of the lithium iron phosphate material; then adding ammonia water into the solution to adjust the pH value of the solution to 5-6 to obtain hydroxide colloid; drying liquid through spraying to prepare powder, and calcining at 300-450° C. for 3-6 hours under an inert atmosphere; coating the oxide with high conductivity obtained by thermally decomposing the hydroxide colloid on the surface of the lithium iron phosphate material grains; ball milling and sieving the calcined material into a finished product. Also disclosed is the composite lithium iron phosphate material produced by such a method.

6 Claims, No Drawings

METHOD FOR PRODUCING COMPOSITE LITHIUM IRON PHOSPHATE MATERIAL AND COMPOSITE LITHIUM IRON PHOSPHATE MATERIAL PRODUCED BY SAME

CROSS REFERENCE TO RELATED PATENT APPLICATION

The present application is the US national stage of PCT/CN2010/000906 filed on Jun. 21, 2010, which claims the priority of the Chinese patent application No. 200910016296.8 filed on Jun. 21, 2009, which application is incorporated herein by reference.

FIELD OF THE INVENTION

The invention relates to modification technology for a lithium iron phosphate material serving as the cathode of a lithium ion battery, in particular to a method for producing a composite lithium iron phosphate material and the composite lithium iron phosphate material produced by the method.

BACKGROUND OF THE INVENTION

Due to its advantages of long cycle life, high safety performance, low cost, good temperature stability, abundant resources, etc., the lithium iron phosphate ($LiFePO_4$) material becomes the first choice of cathode material for a lithium ion power battery. Particularly, the lithium iron phosphate material draws the attention of many domestic and overseas research and development organizations and manufacturers.

However, the lithium iron phosphate material has a defect of low electrical conductivity, which results in high electrochemical polarization and resistance polarization. At present, major methods adopted home and abroad for solving the problem refer to carbon coating, which lowers the contact resistance among lithium iron phosphate particles by the high conductivity of carbon so as to realize the aims of reducing polarization and prolonging cycle life. For example, a Chinese Patent of Invention with the Publication Number of CN101154722A and the Invention Title of "Nuclear shell nanoscale carbon-coated lithium iron phosphate composite cathode material and preparation method thereof", a Chinese Patent of Invention with the Publication Number of CN101162776A and the Invention Title of "Lithium iron phosphate suitable for high magnification power battery and preparation method thereof", a Chinese Patent of Invention with the Publication Number of CN101172599A and the Invention Title of "Method for preparing carbon-coated lithium iron phosphate", a Chinese Patent of Invention with the Publication Number of CN101212049A and the Invention Title of "Cathode material consisting of doped lithium iron phosphate active substance and carbon", etc. are carbon coating methods. Coated carbon material is generally formed through cracking of carbon-containing organic substances such as cane sugar, glucose and cyclodextrin while sintering during the producing process of lithium iron phosphate material.

Some technology adopts a method for doping heterogeneous ions and improving the conductivity of a lithium iron phosphate substrate, such as a Chinese Patent of Invention with the Publication Number of CN1773754A and the Invention Title of "Cathode material consisting of lithium iron phosphate and composite metal phosphide thereof and preparation method", a Chinese Patent of Invention with the Publication Number of CN1785799A and the Invention Title of "Method for preparing transition element-doped lithium iron phosphate powder" and a Chinese Patent of Invention with the Publication Number of CN1830764A and the Invention Title of "Rare earth-doped carbon-coated nanometer cathode material lithium iron phosphate and preparation method thereof".

A Chinese Patent of Invention with the Publication Number of CN101339988A and the Invention Title of "Cathode material of lithium ion battery and preparation method thereof" also discloses a method for generating metal copper on the surface of a lithium iron phosphate material by soaking with copper nitrate and reducing with VC. A Chinese Patent of Invention with the Publication Number of CN1649189A and the Invention Title of "Method for preparing carbon-coated lithium ferrous phosphate composite material containing metal conductive agent" discloses a method for forming elemental copper or silver on the surface of the material by high temperature reduction of copper or silver salt. The technology can improve the electrochemical performance of the material to a certain extent. However, some problems also exist. For example, carbon will severely reduce the stacking and compacted density of the material and large carbon agglomerates tend to form when dispersion is poor. The effect of heterogeneous ion doping is unstable and its function is also unstable. The conductive metal reduction method has complex operation process and it is very difficult to ensure that metal does not undergo side reactions such as oxidation in subsequent processing process.

SUMMARY OF THE INVENTION

Aiming at the problems of low conductivity of the lithium iron phosphate material, uneven dispersion of a coated conductive carbon phase, inhomogeneous quality, etc., the invention discloses a technical principle and a process for modifying the traditional lithium iron phosphate material. An electrochemically active oxide phase with high conductivity is coated on the grain surface of the traditional lithium iron phosphate material so as to realize the aims of enhancing the conductivity of the lithium iron phosphate material and improving the electrochemical performance of the material.

In order to realize the abovementioned aims, the technical scheme adopted by the invention is as follows:

A method for producing a composite lithium iron phosphate material comprising following steps:

confect lithium iron phosphate and purified water at a weight ratio of 1:5-15 into a suspension solution;

slowly adjusting a pH value of the suspension solution to 1-3 with phosphoric acid at a concentration of 5-30% in weight, thereafter adding analytically pure soluble chloride in an amount of 0.05-2% of the molar amount of the lithium iron phosphate to the suspension solution; thereafter adding ammonia water at a concentration of 4-6% in weight into the suspension solution to adjust the pH value of the solution to 5-6 with stirring to obtain hydroxide colloid in the suspension solution;

make the suspension solution having hydroxide colloid to become powder through hot spraying method;

calcine at 300-450° C. for 3-6 hours in inert atmosphere; the hydroxide colloid is decomposed thermally to obtain oxide with high conductivity which is coated on surfaces of the lithium iron phosphate having grains shape; and ball mill and sieve the lithium iron phosphate grains coated with oxide into a finished composite lithium iron phosphate material.

The method for producing the composite lithium iron phosphate material, wherein the analytically pure soluble chloride is one or more of aluminum chloride, titanium chloride and magnesium chloride; the inert atmosphere refers to nitrogen gas or argon gas; and the oxide with high conductivity is one or more of aluminum oxide, titanium oxide and magnesium oxide.

The method for producing the composite lithium iron phosphate material, wherein confect 100 kg of commercial lithium iron phosphate material and 500 kg of purified water into a suspension solution, slowly adjusting a pH value of the suspension solution to 1 with phosphoric acid at a concentration of 5% in weight and adding 0.05 kg of analytically pure aluminum chloride thereafter; then slowly adding ammonia water at a concentration of 5% in weight into the suspension solution to adjust the pH value of the suspension solution to 5 with stirring to obtain aluminum hydroxide colloid; make the suspension solution having hydroxide colloid to become powder through hot spraying; calcine the powder at 300° C. for 6 hours in nitrogen atmosphere; ball milling and sieving the calcined material into a finished product.

The method for producing the composite lithium iron phosphate material, wherein confect 100 kg of commercial lithium iron phosphate material and 1,500 kg of purified water into a suspension solution, slowly adjusting the pH value of the suspension solution to 3 with phosphoric acid at a concentration of 30% in weight and adding 2 kg of analytically pure magnesium chloride thereafter; then slowly adding ammonia water at a concentration of 5% in weight into the suspension solution to adjust the pH value of the suspension solution to 6 with stirring to obtain aluminum hydroxide colloid; make the suspension solution having hydroxide colloid to become powder through hot spraying; calcine the powder at 450° C. for 3 hours in nitrogen atmosphere; ball milling and sieving the calcined material into a finished product.

The method for producing the composite lithium iron phosphate material, wherein confect 100 kg of commercial lithium iron phosphate material and 1,000 kg of purified water into a suspension solution, slowly adjusting the pH value of the suspension solution to 2 with phosphoric acid at a concentration of 10% in weight and adding 1 kg of analytically pure titanium chloride thereafter; then slowly adding ammonia water at a concentration of 5% in weight into the suspension solution to adjust the pH value of the suspension solution to 5.5 with stirring to obtain aluminum hydroxide colloid; make the suspension solution having hydroxide colloid to become powder through hot spraying; calcine the powder at 400° C. for 4 hours in nitrogen atmosphere; ball milling and sieving the calcined material into a finished product.

The method for producing the composite lithium iron phosphate material, wherein confect 200 kg of commercial lithium iron phosphate material and 2,200 kg of purified water into a suspension solution, slowly adjusting the pH value of the suspension solution to 1.8 with phosphoric acid at a concentration of 8% in weight and adding 0.5 kg of analytically pure titanium chloride and 0.5 kg of analytically pure aluminum chloride thereafter; then slowly adding ammonia water at a concentration of 5% in weight into the suspension solution to adjust the pH value of the suspension solution to 5.6 with stirring to obtain aluminum hydroxide colloid; make the suspension solution having hydroxide colloid to become powder through hot spraying; calcine the power at 385° C. for 3.5 hours in argon atmosphere; ball milling and sieving the calcined material into a finished product.

The composite lithium iron phosphate material can be obtained by any of the methods for producing the composite lithium iron phosphate material.

The method realizes performance improvement by after-treatment of the lithium iron phosphate material and is suitable for various lithium iron phosphate cathode materials synthesized by processes such as solid phase synthesis, precipitation synthesis, hydrothermal synthesis and microwave synthesis. In the method, the oxide with high conductivity is coated on the surface of the lithium iron phosphate material, so the conductivity of the lithium iron phosphate material is enhanced, a lithium ion conveying passage is provided and the discharge performance of the lithium iron phosphate material is improved effectively. Particularly, its high-magnification discharge performance is improved greatly.

Further descriptions of the invention are given below in combination with embodiments:

Aiming at the problems of low conductivity of the lithium iron phosphate material, uneven dispersion of a coated conductive carbon phase, inhomogeneous quality, etc., the invention discloses a technical principle and a process for modifying the traditional lithium iron phosphate material. An electrochemically active oxide phase with high conductivity is coated on the grain surface of the traditional lithium iron phosphate material so as to realize the aims of enhancing the conductivity of the lithium iron phosphate material and improving the electrochemical performance of the material. The technology realizes performance improvement by after-treatment of the lithium iron phosphate material and is suitable for various lithium iron phosphate cathode materials synthesized by processes such as solid phase synthesis, precipitation synthesis, hydrothermal synthesis and microwave synthesis.

The oxide with high conductivity mainly refers to aluminum oxide, titanium oxide and magnesium oxide. These oxides generally have crystal structures with low symmetries, large ion passages in crystal lattices and high lithium ion conducting properties. For example, the aluminum oxide itself is a solid electrolyte material. The oxides can be obtained by thermal decomposition of hydroxides thereof. Oxide particles produced by a hydroxide are obtained by decomposing hydroxide colloid, are extremely fine and tend to fully coat lithium iron phosphate grains.

The oxide with high conductivity is coated on the surface of the lithium iron phosphate material, so the conductivity of the lithium iron phosphate material is enhanced, a lithium ion conveying passage is provided and the discharge performance of the lithium iron phosphate material is improved effectively. Particularly, its high-magnification discharge performance is improved greatly.

The process for modifying the performance of the lithium iron phosphate material comprising following steps: confect existing and initially-synthesized lithium iron phosphate material and purified water at a weight ratio of 1:5-15 into a suspension solution;

slowly adjusting a pH value of the suspension solution to 1-3 with phosphoric acid at a concentration of 5-30% in weight, thereafter adding an analytically pure soluble chloride in an amount of 0.05-2% of the molar amount of the lithium iron phosphate to the suspension solution;

thereafter adding ammonia water at a concentration of 4-6% in weight into the suspension solution to adjust the pH value of the solution to 5-6 to obtain hydroxide colloid in the suspension solution;

make the suspension solution having hydroxide colloid to become powder through hot spraying method;

calcine the powder at 300-450° C. for 3-6 hours in inert atmosphere, the hydroxide colloid is decomposed thermally to obtain oxide with high conductivity which is coated on surfaces of the lithium iron phosphate having grains shape; and ball mill and sieve the lithium iron phosphate grains coated with oxide into a finished composite lithium iron phosphate material.

The soluble chloride is one or more of aluminum chloride, titanium chloride and magnesium chloride.

The inert atmosphere refers to nitrogen gas or argon gas.

The oxide with high conductivity is one or more of aluminum oxide, titanium oxide and magnesium oxide.

DETAIL DESCRIPTION OF THE INVENTION

Embodiment 1

The method for producing the composite lithium iron phosphate material, wherein confect 100 kg of commercial lithium iron phosphate and 500 kg of purified water into a suspension solution, slowly adjusting a pH value of the suspension solution to 1 with phosphoric acid at a concentration of 5% in weight, and adding 0.05 kg of analytically pure aluminum chloride thereafter; then slowly adding ammonia water at a concentration of 5% in weight into the suspension solution to adjust the pH value of the suspension solution to 5 with stirring to obtain aluminum hydroxide colloid; make the suspension solution having hydroxide colloid to become powder through hot spraying; calcine the powder at 300° C. for 6 hours in nitrogen atmosphere; ball milling and sieving the calcined material into a finished product, wherein 1 C discharge capacity is increased by 4% when the material is prepared into a 18650 type cylindrical battery.

Embodiment 2

The method for producing the composite lithium iron phosphate material, wherein confect 100 kg of commercial lithium iron phosphate material and 1,500 kg of purified water into a suspension solution, slowly adjusting the pH value of the suspension solution to 3 with phosphoric acid at a concentration of 30% in weight and adding 2 kg of analytically pure magnesium chloride thereafter; then slowly adding ammonia water at a concentration of 5% in weight into the suspension solution to adjust the pH value of the suspension solution to 6 with stirring to obtain aluminum hydroxide colloid; make the suspension solution having hydroxide colloid to become powder through hot spraying; calcine the powder at 450° C. for 3 hours in nitrogen atmosphere; ball milling and sieving the calcined material into a finished product, wherein 1 C discharge capacity is increased by 3.5% when the material is prepared into a 18650 type cylindrical battery.

Embodiment 3

The method for producing the composite lithium iron phosphate material, wherein confect 100 kg of commercial lithium iron phosphate material and 1,000 kg of purified water into a suspension solution, slowly adjusting the pH value of the suspension solution to 2 with phosphoric acid at a concentration of 10% in weight and adding 1 kg of analytically pure titanium chloride thereafter; then slowly adding ammonia water at a concentration of 5% in weight into the suspension solution to adjust the pH value of the suspension solution to 5.5 with stirring to obtain aluminum hydroxide colloid; make the suspension solution having hydroxide colloid to become powder through hot spraying; calcine the powder at 400° C. for 4 hours in nitrogen atmosphere; ball milling and sieving the calcined material into a finished product, wherein 1 C discharge capacity is increased by 5% when the material is prepared into a 18650 type cylindrical battery.

Embodiment 4

The method for producing the composite lithium iron phosphate material, wherein confect 200 kg of commercial lithium iron phosphate material and 2,200 kg of purified water into a suspension solution, slowly adjusting the pH value of the suspension solution to 1.8 with phosphoric acid at a concentration of 8% in weight and adding 0.5 kg of analytically pure titanium chloride and 0.5 kg of analytically pure aluminum chloride thereafter; then slowly adding ammonia water at a concentration of 5% in weight into the suspension solution to adjust the pH value of the suspension solution to 5.6 with stirring to obtain aluminum hydroxide colloid; make the suspension solution having hydroxide colloid to become powder through hot spraying; calcine the power at 385° C. for 3.5 hours in argon atmosphere; ball milling and sieving the calcined material into a finished product, wherein 1 C discharge capacity is increased by 5% and 5 C discharge capacity is increased by 10% when the material is prepared into a 18650 type cylindrical battery.

The embodiments only describe preferred modes of carrying out the invention but not define the concept and protection scope of the invention. On the premise of not breaking away from the design concept of the invention, various modifications and improvements made by ordinary engineering technicians on the technical scheme of the invention are within the protection scope of the invention.

What is claimed is:

1. A method for producing a composite lithium iron phosphate material comprising following steps:
   a, mix lithium iron phosphate and purified water at a weight ratio of 1: 5-15 into a suspension solution;
   b, slowly adjust a pH value of the suspension solution to 1-3 with phosphoric acid at a concentration of 5-30% in weight, thereafter adding analytically pure soluble chloride in an amount of 0.05-2% of the molar amount of the lithium iron phosphate to the suspension solution; thereafter adding ammonia water at concentration of 4-6% in weight into the suspension solution to adjust the pH value of the suspension solution to 5-6 to obtain hydroxide colloid in the suspension solution;
   c, make the suspension solution having hydroxide colloid to become powder through hot spraying method;
   d, calcine the powder at 300-450° C. for 3-6 hours in inert atmosphere, the hydroxide colloid is decomposed thermally to obtain oxide with high conductivity which is coated on surfaces of the lithium iron phosphate having grains shape; and
   e, ball mill and sieve the lithium iron phosphate grains coated with oxide into a finished composite lithium iron phosphate material.

2. The method for producing a composite lithium iron phosphate material according to claim 1, wherein the analytically pure soluble chloride is one or more of aluminum chloride, titanium chloride and magnesium chloride; the inert atmosphere refers to nitrogen gas or argon gas; and the oxide with high conductivity is one or more of aluminum oxide, titanium oxide and magnesium oxide.

3. The method for producing a composite lithium iron phosphate material according to claim 2, wherein step (a) comprises mixing 100 kg of commercial lithium iron phosphate and 500 kg of purified water into a suspension solution;

step (b) comprises slowly adjusting a pH value of the suspension solution to 1 with phosphoric acid at a concentration of 5% in weight, and adding 0.05 kg of analytically pure aluminum chloride thereafter, then slowly adding ammonia water at a concentration of 5% in weight into the suspension solution to adjust the pH value of the suspension solution to 5 with stirring to obtain aluminum hydroxide colloid; step (c) comprises making the suspension solution containing hydroxide colloid into a powder by hot spraying; step (d) comprises calcining the powder at 300° C. for 6 hours in nitrogen atmosphere; and step (e) comprises ball milling and sieving the calcined material into a finished product.

4. The method for producing a composite lithium iron phosphate material according to claim 2, wherein step (a) comprises mixing 100 kg of commercial lithium iron phosphate material and 1,500 kg of purified water into a suspension solution; step (b) comprises slowly adjusting the pH value of the suspension solution to 3 with phosphoric acid at a concentration of 30% in weight and adding 2 kg of analytically pure magnesium chloride thereafter, then slowly adding ammonia water at a concentration of 5% in weight into the suspension solution to adjust the pH value of the suspension solution to 6 with stirring to obtain aluminum hydroxide colloid; step (c) comprises making the suspension solution containing hydroxide colloid into powder by hot spraying; step (d) comprises calcining the powder at 450° C. for 3 hours in nitrogen atmosphere; and step (e) comprises ball milling and sieving the calcined material into a finished product.

5. The method for producing a composite lithium iron phosphate material according to claim 2, wherein step (a) comprises mixing 100 kg of commercial lithium iron phosphate material and 1,500 kg of purified water into a suspension solution; step (b) comprises slowly adjusting the pH value of the suspension solution to 2 with phosphoric acid at a concentration of 10% in weight and adding 1 kg of analytically pure titanium chloride thereafter, then slowly adding ammonia water at a concentration of 5% in weight into the suspension solution to adjust the pH value of the suspension solution to 5.5 with stirring to obtain aluminum hydroxide colloid; step (c) comprises making the suspension solution containing hydroxide colloid into powder by hot spraying; step (d) comprises calcining the powder at 400° C. for 4 hours in nitrogen atmosphere; and step (e) comprises ball milling and sieving the calcined material into a finished product.

6. The method for producing a composite lithium iron phosphate material according to claim 2, wherein step (a) comprises mixing 100 kg of commercial lithium iron phosphate material and 1,500 kg of purified water into a suspension solution, step (b) comprises slowly adjusting the pH value of the suspension solution to 1.8 with phosphoric acid at a concentration of 8% in weight and adding 0.5 kg of analytically pure titanium chloride and 0.5 kg of analytically pure aluminum chloride thereafter, then slowly adding ammonia water at a concentration of 5% in weight into the suspension solution to adjust the pH value of the suspension solution to 5.6 with stirring to obtain aluminum hydroxide colloid; step (c) comprises making the suspension solution containing hydroxide colloid into powder by hot spraying; step (d) comprises calcining the power at 385° C. for 3.5 hours in argon atmosphere; step (e) comprises ball milling and sieving the calcined material into a finished product.

* * * * *